(12) United States Patent
Lee (10) Patent No.: US 9,805,684 B2
(45) Date of Patent: Oct. 31, 2017

(54) DISPLAY PANEL INCLUDING BUFFER CIRCUIT TO COMPENSATE FOR RC DELAY OF A CLOCK SIGNAL

(71) Applicant: SAMSUNG DISPLAY CO., LTD., Yongin-si, Gyeonggi-do (KR)

(72) Inventor: Kwang Sae Lee, Cheonan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 32 days.

(21) Appl. No.: 14/971,442

(22) Filed: Dec. 16, 2015

(65) Prior Publication Data

US 2016/0335972 A1   Nov. 17, 2016

(30) Foreign Application Priority Data

May 11, 2015   (KR) .................. 10-2015-0065449

(51) Int. Cl.
*G09G 3/36* (2006.01)
*G06F 1/04* (2006.01)
*G09G 5/18* (2006.01)

(52) U.S. Cl.
CPC ............. *G09G 3/3677* (2013.01); *G06F 1/04* (2013.01); *G09G 3/3611* (2013.01); *G09G 5/18* (2013.01); *G09G 3/3696* (2013.01); *G09G 2310/08* (2013.01); *G09G 2320/0223* (2013.01)

(58) Field of Classification Search
CPC ... G06F 1/04; G09G 3/36; G09G 5/18; G11C 19/00; G02F 1/1345
See application file for complete search history.

(56) References Cited

U.S. PATENT DOCUMENTS

| | | | |
|---|---|---|---|
| 2011/0134102 A1* | 6/2011 | Lee ..................... | G09G 3/3655 345/212 |
| 2014/0132576 A1* | 5/2014 | Park ..................... | G09G 3/20 345/204 |
| 2014/0313108 A1* | 10/2014 | Kim ..................... | G09G 3/3266 345/76 |
| 2015/0062471 A1* | 3/2015 | Sung ..................... | G09G 3/3655 349/33 |

FOREIGN PATENT DOCUMENTS

| KR | 1020050077573 | 8/2005 |
|---|---|---|
| KR | 1020050082488 | 8/2005 |
| KR | 1020080068420 | 7/2008 |
| KR | 1020130118459 | 10/2013 |
| KR | 1020140124607 | 10/2014 |

* cited by examiner

*Primary Examiner* — Pegeman Karimi
(74) *Attorney, Agent, or Firm* — F. Chau & Associates, LLC (57) ABSTRACT

A display panel includes a plurality of pixels, a gate driver, a clock pad, and a buffer circuit. The gate driver supplies gate signals to the plurality of pixels. The clock pad receives a clock signal. The buffer circuit is connected between the clock pad and the gate driver. The buffer circuit compensates for an RC delay of the clock signal received through the clock pad, and supplies the clock signal of which the RC delay is compensated to the gate driver.

18 Claims, 5 Drawing Sheets

DISPLAY PANEL INCLUDING BUFFER CIRCUIT TO COMPENSATE FOR RC DELAY OF A CLOCK SIGNAL

CROSS-REFERENCE TO RELATED APPLICATION

This application claims priority under 35 U.S.C. §119 to Korean Patent Application No. 10-2015-0065449, filed on May 11, 2015, in the Korean Intellectual Property Office, the disclosure of which is incorporated by reference herein in its entirety.

TECHNICAL FIELD

The present invention relates to a display panel, and more particularly, to a display panel in which a gate driving circuit is embedded.

DISCUSSION OF THE RELATED ART

A liquid crystal display includes two substrates each having electrodes formed thereon and a liquid crystal layer interposed between the two substrates. In the liquid crystal display, the electrodes are disposed on the two substrates while facing each other, and liquid crystal molecules rotate by an electrical signal applied to the electrodes to change light transmittance, and thus an image is displayed.

The liquid crystal display includes a display panel for displaying the image, a backlight unit as a light source, and a driver for driving the display panel. The driver includes a gate driver and a data driver. In particular, as gate driving signals are transferred to the gate driver via a signal line having a line resistance, an RC delay may occur in the gate driving signals. Thus, a method or a configuration of compensating for the RC delay may be used in the display device.

SUMMARY

According to an exemplary embodiment of the present invention, a display panel is provided. The display panel includes a plurality of pixels, a gate driver, a clock pad, and a buffer circuit. The gate driver supplies gate signals to the plurality of pixels. The clock pad receives a clock signal. The buffer circuit is connected between the clock pad and the gate driver. The buffer circuit compensates for an RC delay of the clock signal received through the clock pad, and supplies the clock signal of which the RC delay is compensated to the gate driver.

In an exemplary embodiment of the present invention, a line connecting between the buffer circuit and the gate driver may have a line resistance smaller than that of a line connecting between the clock pad and the buffer circuit.

In an exemplary embodiment of the present invention, a line connecting between the buffer circuit and the gate driver may have a length shorter than a line connecting between the buffer circuit and the clock pad.

In an exemplary embodiment of the present invention, the buffer circuit may be disposed to be more adjacent to an input terminal of the gate driver than to the clock pad.

In an exemplary embodiment of the present invention, the gate driver may include a plurality of stages which output the gate signals, and the buffer circuit may supply the clock signal of which the RC delay is compensated to at least one of the plurality of stages.

In an exemplary embodiment of the present invention, each of the buffer circuits may be disposed between each stage included in the gate driver and the clock pad.

In an exemplary embodiment of the present invention, the buffer circuit may include first to ninth transistors. The first transistor may be connected between a first power line supplying a first voltage and a first node. The first transistor may apply the first voltage to the first node according to the clock signal input from the clock pad. The second and third transistors may be diode-connected between the first node and a second power line supplying a second voltage. The fourth transistor may be connected between the first power line and a second node. The fourth transistor may apply the first voltage to the second node according to a voltage applied to the first node. The fifth transistor may be connected between the second node and the second power line. The fifth transistor may apply the second voltage to the second node according to the clock signal. The sixth transistor may be connected between the first power line and a third node. The sixth transistor may apply the first voltage to the third node according to a voltage applied to the second node. The seventh transistor may be connected between the third node and the second power line. The seventh transistor may apply the second voltage to the third node according to the voltage applied to the first node. The eighth transistor may be connected between the first power line and a fourth node connected to the gate driver. The eighth transistor may apply the first voltage to the fourth node according to a voltage applied to the third node. The ninth transistor may be connected between the fourth node and a third power line supplying a third voltage. The ninth transistor may apply the third voltage to the fourth node according to the voltage applied to the second node. A voltage of the first node may be greater than the second voltage when the first transistor is turned off.

In an exemplary embodiment of the present invention, the buffer circuit may further include a capacitor connected between the second node and the fourth node.

In an exemplary embodiment of the present invention, the second voltage may have a same level as the third voltage.

In an exemplary embodiment of the present invention, the second voltage may have a lower level than the third voltage by a threshold voltage of the ninth transistor.

In an exemplary embodiment of the present invention, the display panel may further include a power pad connected to the buffer circuit. The power pad may receive the second voltage from the outside.

In an exemplary embodiment of the present invention, a voltage difference between the voltage of the second node and a voltage of the fourth node connected to a source terminal of the ninth transistor may be greater than a threshold voltage of the ninth transistor when the clock signal is at a logic low level.

According to an exemplary embodiment of the present invention, a display panel is provided. The display panel includes a plurality of pixels, a gate driver, a clock pad, and a buffer circuit. The gate driver supplies gate signals to the plurality of pixels. The clock pad receives a clock signal. The buffer circuit is connected between the clock pad and the gate driver. The buffer circuit receives the clock signal, compensates for an RC delay of the received clock signal, and outputs the compensated clock signal to the gate driver. The buffer circuit includes first and second transistors. The first transistor is connected between the first power line and an output node connected to the gate driver. The first transistor transfers a first voltage of the first power line to the output node when the clock signal is at a logic high level.

The second transistor is connected between the second power line and the output node. The second transistor transfers a second voltage of the second power line to the output node when the clock signal is at a logic low level. A voltage of a gate terminal of the second transistor is lower than the second voltage when the second transistor is turned on and the clock signal is at the logic low level.

In an exemplary embodiment of the present invention, the buffer circuit may further include third to seventh transistors. The third transistor may be connected between the first power line and a first node. The third transistor may apply the first voltage of the first power line to the first node in response to the clock signal. The fourth and fifth transistors may be diode-connected between the first node and a third power line supplying a third voltage. The sixth transistor may be connected between the first power line and the gate terminal of the second transistor. The sixth transistor may apply the first voltage of the first power line to the gate terminal of the second transistor in response to a voltage of the first node. The seventh transistor may be connected between the gate terminal of the second transistor and the third power line. The seventh transistor may apply the third voltage of the third power line to the gate terminal of the second transistor according to the clock signal.

In an exemplary embodiment of the present invention, the buffer circuit may further include a capacitor connected between the gate terminal of the second transistor and a source terminal of the second transistor.

In an exemplary embodiment of the present invention, the first voltage may correspond to the logic high level of the clock signal, and the second voltage may correspond to the logic low level of the clock signal.

In an exemplary embodiment of the present invention, the second voltage may have a same level as the third voltage.

In an exemplary embodiment of the present invention, the display panel may further include a power pad connected to the buffer circuit. The power pad may receive the third voltage from the outside.

DETAILED DESCRIPTION OF THE EMBODIMENTS

Exemplary embodiments of the present invention will be described in more detail with reference to the accompanying drawings. The present inventive concept, however, may be embodied in various forms and should not be construed as being limited to the exemplary embodiments set forth herein. Like reference numerals may designate like elements throughout the specification and drawings.

Hereinafter, a display panel according to exemplary embodiments of the present invention will be described in detail with reference to the accompanying drawings.

Figure 1:
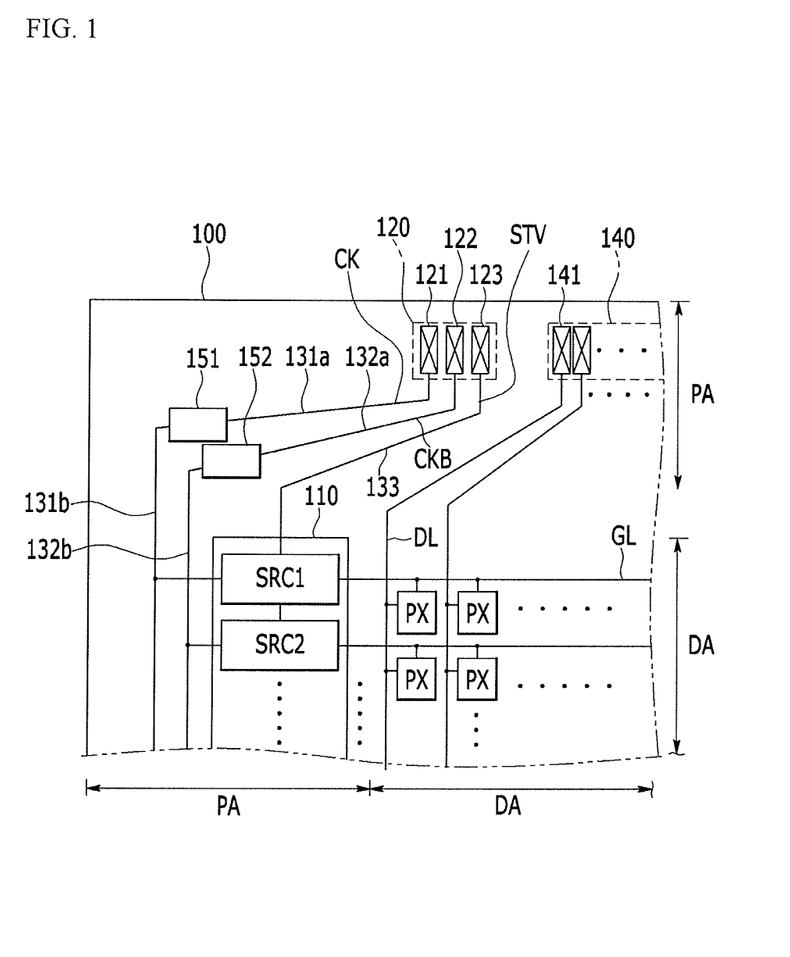
FIG. 1 is a plan view illustrating a portion of a display panel according to an exemplary embodiment of the present invention.

FIG. 1 is a plan view illustrating a portion of a display panel according to an exemplary embodiment of the present invention.

Referring to FIG. 1, the display panel according to an exemplary embodiment of the present invention includes a base substrate 100. The base substrate 100 includes a display area DA in which a plurality of pixels PXs are formed and a peripheral area PA enclosing the display area DA.

A plurality of gate lines GLs and a plurality of data lines DLs are formed in the display area DA. The plurality of pixels PXs is formed in the display area DA. Each of the pixels PXs is defined by a corresponding one of the gate lines GLs and a corresponding one of the data lines DLs intersecting each other.

The gate driver 110 is disposed in the peripheral area PA.

The gate driver 110 is electrically connected to the gate lines GLs and applies the gate signals to the gate lines GLs. The gate driver 110 includes a plurality of stages each of which outputs each of the gate signals to each of the gate lines GLs. The stages of the gate driver 110 are cascaded one to another and each stage is configured as a shift register circuit (SRC).

The gate driver 110 starts driving when a vertical start signal is applied to a first stage SRC1 among the plurality of stages. Each stage includes a plurality of switching elements which may be formed by the same process as a switching element formed in the display area DA.

A gate pad part 120 is disposed in the peripheral area PA. The gate pad part 120 receives gate driving signals from the outside. The gate driving signals are applied to the gate driver 110.

The gate pad part 120 receives the gate driving signals such as a first clock signal CK, a second clock signal CKB, a vertical start signal STV, or the like, from the outside.

The gate pad part 120 includes a first clock pad 121 receiving the first clock signal CK, a second clock pad 122 receiving the second clock signal CKB, a start pad 123 receiving the vertical start signal STV, and so on.

The data pad part 140 is disposed in the peripheral area PA.

The data pad part 140 includes a plurality of data pads 141 which applies data signals to the data lines DLs.

A plurality of signal lines 131a, 131b, 132a, 132b, and 133 transfers the gate driving signals received through the gate pad part 120 to the gate driver 110, and a plurality of compensators 151 and 152 is disposed in the peripheral area PA.

The plurality of signal lines transferring the gate driving signals to the gate driver 110 include first to fourth clock lines 131a, 131b, 132a, and 132b and a vertical start line 133.

The first and second clock lines 131a and 131b electrically connect between the first clock pad 121 and odd-numbered stages of the gate driver 110. The first and second clock lines 131a and 131b transfer the first clock signal CK received through the first clock pad 121 to the odd-numbered stages of the gate driver 110.

The third and fourth clock lines 132a and 132b electrically connect between the second clock pad 122 and even-numbered stages of the gate driver 110. The third and fourth clock lines 132a and 132b transfer the second clock signal CKB received through the second clock pad 122 to the even-numbered stages of the gate driver 110.

The vertical start line 133 electrically connects between the start pad 123 and the gate driver 110. The vertical start line 133 supplies the vertical start signal STV received through the start pad 123 to the gate driver 110. The vertical start line 133 is electrically connected to a first stage SRC1 of the gate driver 110. The vertical start line 133 transfers the vertical start signal STV supplied from the start pad 123 to the first stage SRC1 of the gate driver 110. The vertical start line 133 may further be connected to a final stage of the gate driver 110 to transfer the vertical start signal STV to the final stage.

The first and second compensators 151 and 152 are disposed in the peripheral area PA.

The first compensator 151 is disposed between the first clock pad 121 and the gate driver 110. For example, the first clock pad 121 is electrically connected to the gate driver 110 via the first compensator 151. The first compensator 151 is connected to the first clock pad 121 through the first clock line 131a and receives the first clock signal CK output from the first clock pad 121 through the first clock line 131a. The first compensator 151 is connected to the odd-numbered stages of the gate driver 110 through the second clock line 131b. The first compensator 151 supplies the first clock signal CK to the odd-numbered stages of the gate driver 110.

When the first clock signal CK is transmitted through the first clock line 131a, an RC delay occurs due to a line resistance of the first clock line 131a. The first clock signal CK having the RC delay is input to the first compensator 151. The first compensator 151 includes a buffer circuit (see reference numeral 1 of FIG. 2). The first compensator 151 compensates for the RC delay of the first clock signal CK transferred through the first clock line 131a by using the buffer circuit 1 and supplies the first clock signal CK of which the RC delay is compensated to the odd-numbered stages of the gate driver 110.

The second compensator 152 is disposed between the second clock pad 122 and the gate driver 110. For example, the second clock pad 122 is electrically connected to the gate driver 110 via the second compensator 152. The second compensator 152 is connected to the second clock pad 122 through the third clock line 132a and receives the second clock signal CKB output from the second clock pad 121 through the third clock line 132a. The second compensator 152 is connected to the even-numbered stages of the gate driver 110 through the fourth clock line 132b and supplies the second clock signal CKB to the even-numbered stages of the gate driver 110.

The second clock signal CKB is input to the second compensator 152 in the state in which the RC delay occurs due to the line resistance of the third clock line 132a. The second compensator 152 includes the buffer circuit (see reference numeral 1 of FIG. 2) and compensates for the RC delay of the second clock signal CKB transferred through the third clock line 132a by using the buffer circuit and supplies the second clock signal CKB of which the RC delay is compensated to the even-numbered stages of the gate driver 110.

The first and second clock signals CK and CKB of which the RC delays are respectively compensated by the first and second compensators 151 and 152 may have the RC delay when the first and second clock signals CK and CKB pass through the second and fourth clock lines 131b and 132b, respectively. In an exemplary embodiment, a length of each of the second and fourth clock lines 131b and 132b is smaller than that of each of the first and third clock lines 131a and 132a, so that an RC delay occurring due to each of the second and fourth clock lines 131b and 132b may be minimized. In an exemplary embodiment, a line resistance of each of the second and fourth clock lines 131b and 132b is smaller than that of each of the first and third clock lines 131a and 132a.

In an exemplary embodiment, each of the first and second compensators 151 and 152 is disposed to be more adjacent to an input terminal of the gate driver 110 than to each of the first and second clock pads 121 and 122 to minimize the length of each of the second and fourth clock lines 131b and 132b. For example, the input terminal of the gate driver 110 may be disposed in the gate driver or disposed adjacent to the gate driver. In an exemplary embodiment, a distance from each of the first and second compensators 151 and 152 to the gate driver 110 is less than a distance from each of the first and second compensators 151 and 152 to each of the first and second clock pads 121 and 122.

FIG. 1 illustrates an example in which only one compensator for compensating for the RC delay is disposed for each of the clock pads 121 and 122, but the exemplary embodiment of the present invention is not limited thereto. Thus, in an exemplary embodiment, a plurality of compensators may be disposed for each of the clock pads 121 and 122.

For example, the plurality of compensators for compensating for the RC delay may be disposed for each stage of the gate driver 110. In this case, each of the plurality of compensators for compensating for the RC delay is disposed between each of the clock pads 121 and 122 and each stage of the gate driver 110.

Further, for example, the stages of the gate driver 110 includes a plurality of groups, and each compensator for compensating for the RC delay may be disposed for each stage group. In this case, the plurality of compensators is disposed between each of the clock pads 121 and 122 and the gate driver 110, and each of the plurality of compensators may be connected to each of the plurality of stages of the gate driver 110.

Hereinafter, a buffer circuit of each of the first and second compensators 151 and 152 in the display panel according to an exemplary embodiment of the present invention will be described with reference to FIGS. 2 and 3.

Figure 2:
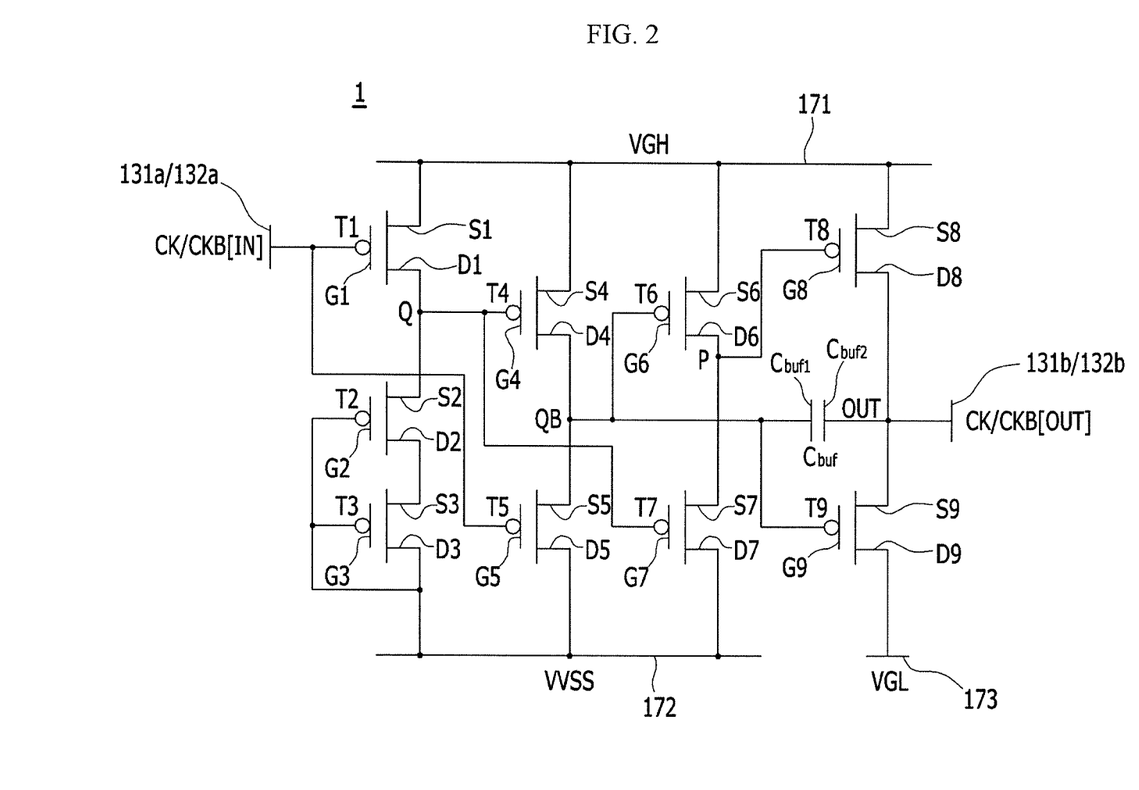
FIG. 2 is a circuit diagram of a buffer circuit according to an exemplary embodiment of the present invention.
Figure 3:
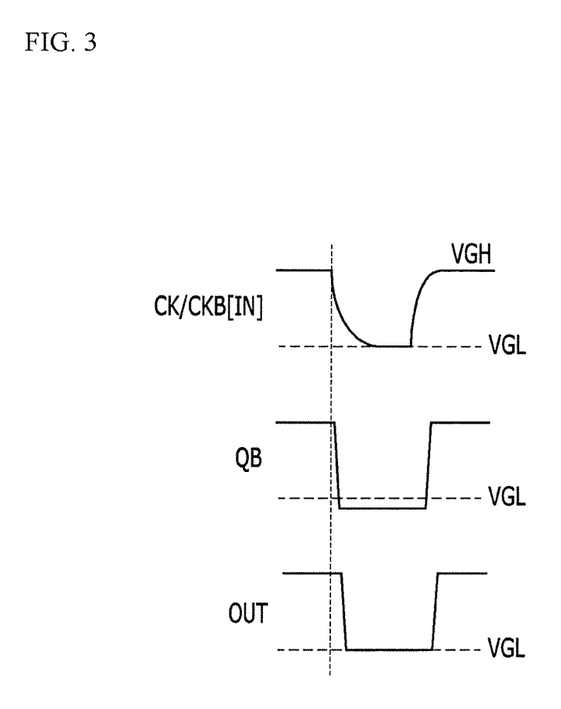
FIG. 3 is a timing diagram of the buffer circuit of FIG. 2 according to an exemplary embodiment of the present invention.

FIG. 2 is a circuit diagram of a buffer circuit according to an exemplary embodiment of the present invention, and FIG. 3 is a timing diagram of the buffer circuit of FIG. 2 according to an exemplary embodiment of the present invention.

Referring to FIGS. 2 and 3, the buffer circuit 1 according to an exemplary embodiment of the present invention includes a plurality of transistors T1, T2, T3, T4, T5, T6, T7, T8, and T9 and a capacitor $C_{buf}$.

A gate electrode G1 of the first transistor T1 is connected to the first clock line 131a (or the third clock line 132a). Further, a source electrode S1 of the first transistor T1 is connected to a first power line 171 to which a first voltage VGH is applied, and a drain electrode D1 of the first transistor T1 is connected to a first node Q. The first voltage VGH corresponds to a high-level voltage of the first or second clock signal CK or CKB. For example, the first voltage VGH may be a gate-on voltage of a gate driving signal corresponding to, e.g., the first or second clock signal CK or CKB. The first transistor T1 is turned on or turned off depending on the clock signal CK (or the clock signal CKB) input through the first clock line 131a (or the third clock line 132a) and the first voltage VGH is transferred to the first node Q when the first transistor T1 is turned on.

The second and third transistors T2 and T3 are diode-connected between the first node Q and a second power line 172 to which a second voltage VVSS is applied. For example, a source electrode S2 of the second transistor T2 is connected to the first node Q, and a drain electrode D2 of the second transistor T2 is connected to a source electrode S3 of the third transistor T3. Further, the gate electrodes G2 and G3 of the second transistor T2, the third transistor T3 are commonly connected to the second power line 172 to which the second voltage VVSS is applied, and a drain electrode D3 of the third transistor T3 is connected to the second power line 172. Here, the second voltage VVSS corresponds to a base voltage or a low-level voltage of the first or second clock signal CK or CKB. For example, the second voltage VVSS may correspond to a gate-off voltage of a gate driving signal corresponding to, e.g., the first or second clock signal CK or CKB. Since the second and third transistors T2 and T3 are diode-connected between the first node Q and the second power line 172, a voltage of the first node Q is greater than the second voltage VVSS by the threshold voltage of the second and third transistors T2 and T3 when the first transistor T1 is turned off.

A gate electrode G4 of the fourth transistor T4 is connected to the first node Q and a source electrode S4 of the fourth transistor T4 is connected to the first power line 171. Further, the drain electrode D4 of the fourth transistor T4 is connected to a second node QB. The fourth transistor T4 is turned on or turned off depending on the voltage at the first node Q, and the first voltage VGH is transferred to the second node QB when the fourth transistor T4 is turned on.

A gate electrode G5 of the fifth transistor T5 is connected to the first clock line 131a (or the third clock line 132a). Further, a source electrode S5 of the fifth transistor T5 is connected to the second node QB and a drain electrode D5 of the fifth transistor T5 is connected to the second power line 172. The fifth transistor T5 is turned on or turned off depending on the clock signals CK (or the clock signal CKB) transferred through the first clock line 131a (or the third clock line 132a) and the second voltage VVSS is transferred to the second node QB when the fifth transistor T5 is turned on.

A gate electrode G6 of the sixth transistor T6 is connected to the second node QB and a source electrode S6 of the sixth transistor T6 is connected to the first power line 171. Further, a drain electrode D6 of the sixth transistor T6 is connected to a third node P. The sixth transistor T6 is turned on or turned off depending on the voltage at the second node QB and the first voltage VGH is transferred to the third node P when the sixth transistor T6 is turned on.

A gate electrode G7 of the seventh transistor T7 is connected to the first node Q and a source electrode S7 of the seventh transistor T7 is connected to the third node P. Further, a drain electrode D7 of the seventh transistor T7 is connected to the second power line 172. The seventh transistor T7 is turned on or turned off depending on the voltage at the first node Q and the second voltage VVSS is transferred to the third node P when the seventh transistor T7 is turned on.

A gate electrode G8 of the eighth transistor T8 is connected to the third node P and a source electrode S8 of the eighth transistor T8 is connected to the first power line 171. Further, a drain electrode D8 of the eighth transistor T8 is connected to an output node OUT. The output node OUT is connected to the second clock line 131b (or the fourth clock line 132b). The eighth transistor T8 is turned on or turned off depending on the voltage at the third node P and the first voltage VGH is transferred to the second clock line 131b (or the fourth clock line 132b) when the eighth transistor T8 is turned on.

A gate electrode G9 of the ninth transistor T9 is connected to the second node QB and a source electrode S9 of the ninth transistor T9 is connected to the output node OUT. Further, a drain electrode D9 of the ninth transistor T9 is connected to a third power line 173 to which a third voltage VGL is supplied. The third voltage VGL corresponds to the gate-off voltage and a low level voltage of each of the clock signals CK and CKB. Further, the third voltage VGL may have the same voltage level as the second voltage VVSS. The ninth transistor T9 is turned on or turned off depending on the voltage at the second node QB and the third voltage VGL is transferred to the second clock line 131b (or the fourth clock line 132b) when the ninth transistor T9 is turned on.

When the clock signal CK (or the clock signal CKB) applied through the first clock line 131a (or the third clock line 132a) is at a low level, the first transistor T1 and the fifth transistor T5 are turned on. Therefore, the first voltage VGH is applied to the first node Q, and the second voltage VVSS is applied to the second node QB. When the second voltage VVSS is applied to the second node QB, the sixth transistor T6 and the ninth transistor T9 are turned on. At this time, the eighth transistor T8 is turned off by the turn on of the sixth transistor T6, and thus the third voltage VGL is applied to the output node OUT.

When the clock signal CK (the clock signal CKB) applied through the first clock line 131a (or the third clock line 132a) is at a high level, the first transistor T1 and the fifth transistor T5 are turned off. Therefore, a voltage of the first node Q is greater than the second voltage VVSS by the threshold voltage of the second and third transistors T2 and T3. In addition, the fourth transistor T4 and the seventh transistor T7 are turned on by the low-level voltage applied to the first node Q. When the fourth transistor T4 and the seventh transistor T7 are turned on, the first voltage VGH is applied to the second node QB, and thus, the sixth transistor T6 and the ninth transistor T9 are turned off and the eighth transistor T8 is turned on. Thus, the first voltage VGH is applied to the output node OUT.

When the clock signal CK (or the clock signal CKB) applied through the first clock line 131a (or the third clock line 132a) is at the low level, a voltage difference between the gate electrode G9 and the source electrode S9 of the ninth transistor T9 needs to be equal to or greater than a threshold voltage of the ninth transistor T9 to maintain the state in which the ninth transistor T9 is turned on.

To this end, the capacitor $C_{buf}$ is connected between the gate electrode G9 and the source electrode S9 of the ninth transistor T9. One terminal Cbuf1 of the capacitor $C_{buf}$ is connected to the gate electrode G9 of the ninth transistor T9 and another terminal $C_{buf}$2 of the capacitor $C_{buf}$ is connected to the source electrode S9 of the ninth transistor T9. The capacitor $C_{buf}$ serves to maintain the voltage between the gate electrode G9 and the source electrode S9 of the ninth transistor T9 to be equal or greater than the threshold voltage of the transistor T9, so that the ninth transistor T9 is turned on. For example, as illustrated in FIG. 3, the capacitor $C_{buf}$ applies a voltage lower than the third voltage VGL to the gate electrode G9 (or the second node QB) of the ninth transistor T9 when the second voltage VVSS of a low-level is applied to the second node QB and thus the ninth transistor T9 is turned on.

While FIG. 2 illustrates the buffer circuit 1 including nine P channel transistors and one capacitor, the present invention is not limited thereto. The number and kind of transistors configuring the buffer circuit 1 included in each of the first and second compensators 151 and 152 and the number of capacitors may be variously changed.

Figure 4:
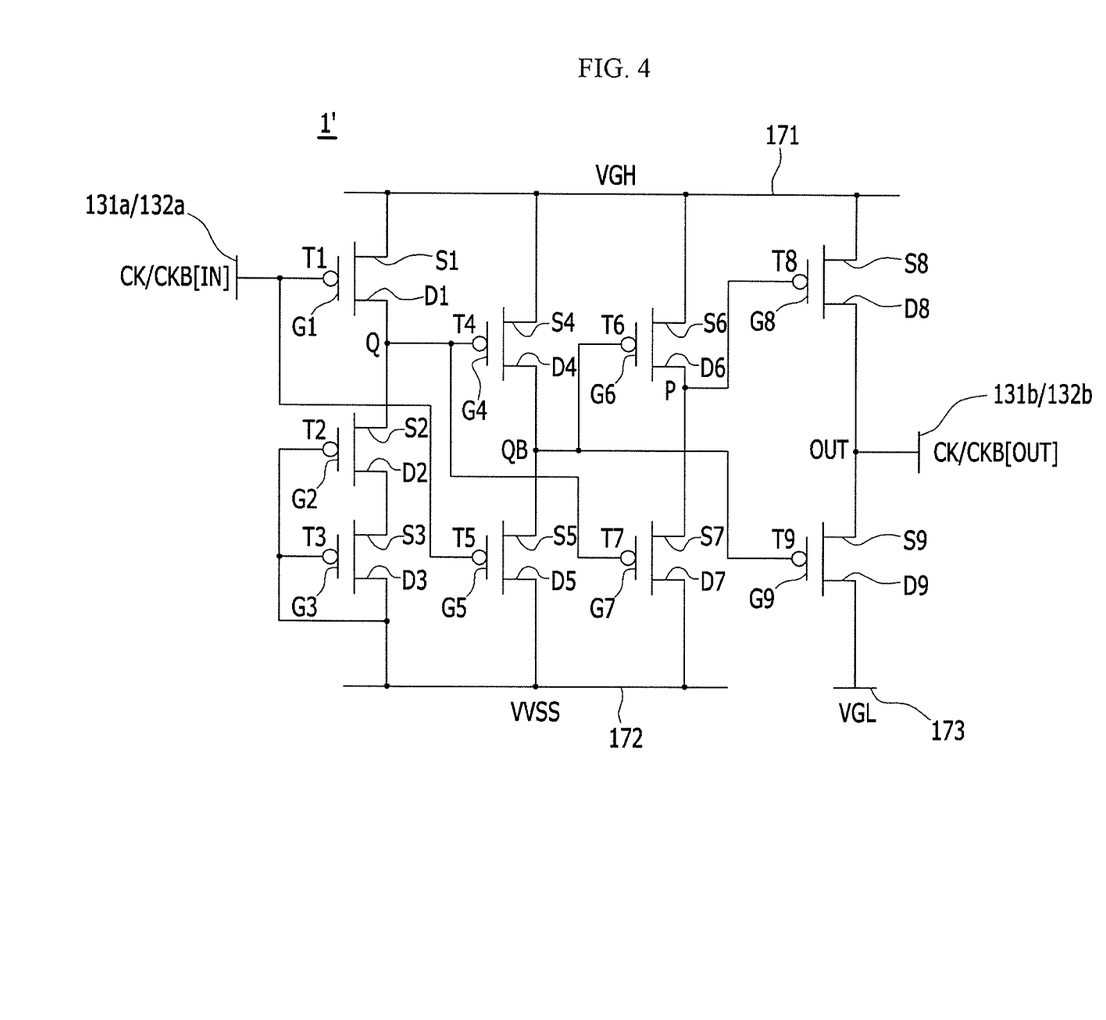
FIG. 4 is a circuit diagram of a buffer circuit according to an exemplary embodiment of the present invention.

For example, the buffer circuit 1 in each of the first and second compensators 151 and 152 may be implemented without the capacitor $C_{buf}$, as illustrated in FIG. 4.

FIG. 4 is a circuit diagram of a buffer circuit according to an exemplary embodiment of the present invention. The buffer circuit 1' of FIG. 4 has substantially the same configurations and operations as the buffer circuit 1 of FIG. 2 except that the capacitor $C_{buf}$ is omitted and the gate and source electrodes of the ninth transistor are not connected to each other in FIG. 4. Therefore, to avoid redundant description, same or similar operations of the buffer circuit of FIG. 2 will be omitted or briefly described below.

Referring to FIG. 4, when the clock signal CK (or the clock signal CKB) applied through the first clock line 131a (or the third clock line 132a) is at a low level, the first transistor T1 and the fifth transistor T5 are turned on, and thus, the first voltage VGH and the second voltage VVSS are applied to the first node Q and the second node QB, respectively. Further, when the second voltage VVSS is applied to the second node QB, the sixth transistor T6 and the ninth transistor T9 are turned on and the third voltage VGL is applied to the output node OUT.

In FIG. 4, the second voltage VVSS supplied to the drain electrodes D3, D5, and D7 of the third, fifth and seventh transistors T3, T5, and T7 is lower than the third voltage VGL (e.g., the gate-off voltage) by a voltage level equal to or greater than the threshold voltage of the ninth transistor T9. As described above, in the buffer circuit 1 of FIG. 2, the second voltage VVSS may have the same voltage level as the third voltage VGL. Therefore, even though the capacitor $C_{buf}$ between the gate and source electrodes G9 and S9 of the ninth transistor T9 (e.g., between the second node QB and the output node OUT) is omitted, a voltage (e.g., the second voltage VVSS) lower than the third voltage VGL may be supplied to the gate electrode G9 of the ninth transistor T9. For example, even though the ninth transistor T9 is turned on and the third voltage VGL is applied to the source electrode S9 of the ninth transistor T9, the second voltage VVSS lower than the third voltage VGL is applied to the gate electrode G9 of the ninth transistor T9. Thus, the ninth transistor T9 may maintain a turn on state.

Figure 5:
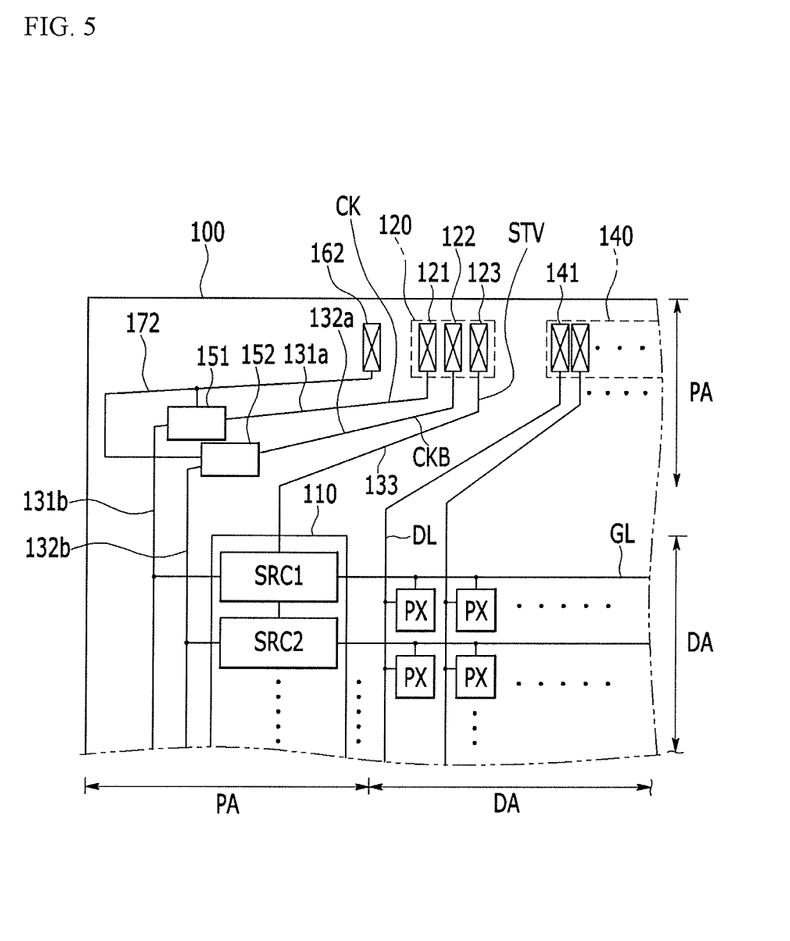
FIG. 5 is a plan view illustrating a portion of a display panel according to an exemplary embodiment of the present invention.

As described with reference to FIG. 4, to apply the second voltage VVSS lower than the third voltage VGL to the buffer circuit 1', as illustrated in FIG. 5, the power pad 162 for receiving the second voltage VVSS from the outside and the second power line 172 for supplying the second voltage VVSS to the buffer circuit 1' of each of the first and second compensators 151 and 152 are additionally disposed in the peripheral area PA of the display panel.

As set forth above, in the display panel according to an exemplary embodiment of the present invention, the RC delay of the gate driving signal transferred to the gate driver 110 may be minimized by disposing the buffer circuit (e.g., 1 of FIG. 2 or 1' of FIG. 4) between the input pad and the gate driver. Further, a scan time margin for each pixel may be increased by compensating for the RC delay of the gate driving signal transferred from the input pad to the gate driver.

While the present invention has been particularly shown and described with reference to the exemplary embodiments thereof, it will be understood that various changes in forms and details may be made therein without departing from the spirit and scope of the present inventive concept.

What is claimed is:

1. A display panel, comprising:
   a plurality of pixels;
   a gate driver supplying gate signals to the plurality of pixels;
   a start pad receiving a vertical start signal;
   a clock pad receiving a clock signal;
   a buffer circuit connected between the clock pad and the gate driver,
   wherein the buffer circuit compensates for an RC delay of the clock signal received through the clock pad, and supplies the clock signal of which the RC delay is compensated to the gate driver,
   wherein the gate driver is configured to include a plurality of stages which are cascaded one to another,
   wherein the buffer circuit is configured to be connected between the clock pad and a first stage of the plurality of stages, and
   wherein the first stage is configured to be connected directly to a vertical start line which transfers the vertical start signal supplied from the start pad to the gate driver.

2. The display panel of claim 1, wherein: a line connecting between the buffer circuit and the gate driver has a line resistance smaller than that of a line connecting between the clock pad and the buffer circuit.

3. The display panel of claim 1, wherein: a line connecting between the buffer circuit and the gate driver has a length shorter than a line connecting between the buffer circuit and the clock pad.

4. The display panel of claim 1, wherein: the buffer circuit is disposed to be more adjacent to an input terminal of the gate driver than to the clock pad.

5. The display panel of claim 1, further comprising:
   at least one buffer circuit supplying the clock signal of which the RC delay is compensated to at least one of the plurality of stages.

6. The display panel of claim 5, wherein: each buffer circuit is disposed between each stage included in the gate driver and the clock pad.

7. The display panel of claim 1, wherein: the buffer circuit includes:
   a first transistor connected between a first power line supplying a first voltage and a first node, the first transistor applying the first voltage to the first node according to the clock signal input from the clock pad;
   second and third transistors diode-connected between the first node and a second power line supplying a second voltage;
   a fourth transistor connected between the first power line and a second node, the fourth transistor applying the first voltage to the second node according to a voltage applied to the first node;
   a fifth transistor connected between the second node and the second power line, the fifth transistor applying the second voltage to the second node according to the clock signal;
   a sixth transistor connected between the first power line and a third node, the sixth transistor applying the first voltage to the third node according to a voltage applied to the second node;
   a seventh transistor connected between the third node and the second power line, the seventh transistor applying the second voltage to the third node according to the voltage applied to the first node;
   an eighth transistor connected between the first power line and a fourth node connected to the gate driver, the eighth transistor applying the first voltage to the fourth node according to a voltage applied to the third node; and a ninth transistor connected between the fourth node and a third power line supplying a third voltage, the ninth transistor applying the third voltage to the fourth node according to the voltage applied to the second node, wherein a voltage of the first node is greater than the second voltage when the first transistor is turned off.

8. The display panel of claim 7, wherein: the buffer circuit further includes a capacitor connected between the second node and the fourth node.

9. The display panel of claim 8, wherein: the second voltage has a same level as the third voltage.

10. The display panel of claim 7, wherein: the second voltage has a lower level than the third voltage by a threshold voltage of the ninth transistor.

11. The display panel of claim 10, further comprising: a power pad connected to the buffer circuit, the power pad receiving the second voltage from the outside.

12. The display panel of claim 7, wherein: a voltage difference between the voltage of the second node and a voltage of the fourth node connected to a source terminal of the ninth transistor is greater than a threshold voltage of the ninth transistor when the clock signal is at a logic low level.

13. A display panel, comprising:
a plurality of pixels;
a gate driver supplying gate signals to the plurality of pixels;
a clock pad receiving a clock signal; and
a buffer circuit connected between the clock pad and the gate driver,
wherein the buffer circuit receives the clock signal, compensates for an RC delay of the received clock signal, and outputs the compensated clock signal to the gate driver,
wherein the buffer circuit includes first and second transistors, wherein the first transistor is connected between a first power line and an output node connected to the gate driver, and the first transistor transfers a first voltage of the first power line to the output node when the clock signal is at a logic high level, wherein the second transistor is connected between a second power line and the output node, and the second transistor transfers a second voltage of the second power line to the output node when the clock signal is at a logic low level, and wherein a voltage of a gate terminal of the second transistor is lower than the second voltage when the second transistor is turned on and the clock signal is at the logic low level.

14. The display panel of claim 13, wherein the buffer circuit further includes third to seventh transistors, wherein the third transistor is connected between the first power line and a first node, and the third transistor applies the first voltage of the first power line to the first node in response to the clock signal, wherein the fourth and fifth transistors are diode-connected between the first node and a third power line supplying a third voltage, and wherein the sixth transistor is connected between the first power line and the gate terminal of the second transistor, and the sixth transistor applies the first voltage of the first power line to the gate terminal of the second transistor in response to a voltage of the first node, and wherein the seventh transistor is connected between the gate terminal of the second transistor and the third power line, and the seventh transistor applies the third voltage of the third power line to the gate terminal of the second transistor according to the clock signal.

15. The display panel of claim 13, wherein: the buffer circuit further includes a capacitor connected between the gate terminal of the second transistor and a source terminal of the second transistor.

16. The display panel of claim 15, wherein: the second voltage has a same level as the third voltage.

17. The display panel of claim 13, wherein: the first voltage corresponds to the logic high level of the clock signal, and the second voltage corresponds to the logic low level of the clock signal.

18. The display panel of claim 13, further comprising: a power pad connected to the buffer circuit, the power pad receiving the third voltage from the outside.

* * * * *